United States Patent
Colnot et al.

(10) Patent No.: US 9,563,754 B2
(45) Date of Patent: Feb. 7, 2017

(54) METHOD OF GENERATING A STRUCTURE AND CORRESPONDING STRUCTURE

(71) Applicant: NXP B.V., Eindhoven (NL)

(72) Inventors: Vincent Cedric Colnot, Leuven (BE); Peter Maria Franciscus Rombouts, Sint-Katelijne-Waver (BE); Philippe Teuwen, Leuven (BE); Frank Michaud, Brussels (BE)

(73) Assignee: NXP B.V., Eindhoven (NL)

( * ) Notice: Subject to any disclaimer, the term of this patent is extended or adjusted under 35 U.S.C. 154(b) by 27 days.

(21) Appl. No.: 14/549,502

(22) Filed: Nov. 20, 2014

(65) Prior Publication Data

US 2015/0143533 A1    May 21, 2015

(30) Foreign Application Priority Data

Nov. 21, 2013    (EP) .................................... 13290290

(51) Int. Cl.
| | |
|---|---|
| *H04L 29/06* | (2006.01) |
| *G06F 21/14* | (2013.01) |
| *G06Q 20/32* | (2012.01) |
| *G06F 21/53* | (2013.01) |
| *G06F 21/71* | (2013.01) |

(Continued)

(52) U.S. Cl.
CPC ................. *G06F 21/14* (2013.01); *G06F 8/51* (2013.01); *G06F 8/76* (2013.01); *G06F 9/46* (2013.01); *G06F 21/53* (2013.01); *G06F 21/71* (2013.01); *G06Q 20/3227* (2013.01);

(Continued)

(58) Field of Classification Search
CPC ........... H04L 2463/102; H04L 63/0853; G06Q 20/3227; G06F 21/14; G06F 21/53; G06F 21/71; G06F 8/51; G06F 8/76; G06F 2221/2107
See application file for complete search history.

(56) References Cited

U.S. PATENT DOCUMENTS

| | | | |
|---|---|---|---|
| 6,598,166 B1 | 7/2003 | Folmsbee | |
| 8,171,453 B2 * | 5/2012 | Meijer | G06F 8/436 717/114 |

(Continued)

FOREIGN PATENT DOCUMENTS

| | | |
|---|---|---|
| EP | 2482184 A1 | 1/2012 |
| EP | 2 482 184 A1 | 8/2012 |

(Continued)

OTHER PUBLICATIONS

Dube, T. E. et al. "Hindering Reverse Engineering: Thinking Outside the Box", IEEE Security & Privacy, vol. 6, No. 2, pp. 58-65 (Mar. 2008).

(Continued)

*Primary Examiner* — Don Zhao

(57) ABSTRACT

Disclosed is a method of generating a structure comprising at least one virtual machine, the method comprising: obfuscating a first virtual machine source code, thereby yielding a first obfuscated virtual machine (OVM) source code; associating a processor identifier with the first OVM source code, thereby yielding a processor-specific first OVM source code; compiling the processor-specific first OVM source code, thereby yielding a processor-specific first OVM. Furthermore, a structure generated by said method is disclosed.

14 Claims, 3 Drawing Sheets

(51) Int. Cl.
   *G06F 9/45* (2006.01)
   *G06F 9/44* (2006.01)
   *G06F 9/46* (2006.01)

(52) U.S. Cl.
   CPC .. *H04L 63/0853* (2013.01); *G06F 2221/2107* (2013.01); *H04L 2463/102* (2013.01)

(56) References Cited

U.S. PATENT DOCUMENTS

| | | | |
|---|---|---|---|
| 2002/0144117 A1 | 10/2002 | Faigle | |
| 2003/0023859 A1* | 1/2003 | Kiddy | G06F 21/125 713/189 |
| 2005/0071438 A1* | 3/2005 | Liao | G06F 8/4442 709/214 |
| 2006/0026430 A1* | 2/2006 | Luo | G06F 21/16 713/176 |
| 2010/0281459 A1* | 11/2010 | Betouin | G06F 8/423 717/106 |
| 2010/0313079 A1* | 12/2010 | Beretta | G06F 9/5055 714/48 |
| 2011/0066999 A1 | 3/2011 | Rabinovich et al. | |
| 2011/0225417 A1 | 9/2011 | Maharajh et al. | |
| 2013/0047142 A1* | 2/2013 | Bates | G06F 8/41 717/140 |
| 2013/0232198 A1* | 9/2013 | Tenbrock | H04L 67/104 709/204 |
| 2013/0304651 A1 | 11/2013 | Smith | |
| 2013/0311993 A1* | 11/2013 | Benedetti | G06F 8/37 718/1 |
| 2014/0157291 A1* | 6/2014 | Adams | G06F 9/44521 719/331 |

FOREIGN PATENT DOCUMENTS

| | | |
|---|---|---|
| JP | 2138622 A | 5/1990 |
| JP | 2009223638 A | 10/2009 |
| JP | 2011204105 A | 10/2011 |

OTHER PUBLICATIONS

Sinclair, S. et al. "PorKI: Making User PKI Safe on Machines of Heterogeneous Trustworthiness", IEEE 21st Annual Computer Security Applications Conf., pp. 419-430 (Dec. 5, 2005).

Extended European Search Report for Patent Appln. No. 13290290.9 (Jun. 2, 2014).

First Office Action dated Nov. 24, 2015 from JP Application No. 2014-232087.

* cited by examiner

US 9,563,754 B2

METHOD OF GENERATING A STRUCTURE AND CORRESPONDING STRUCTURE

CROSS-REFERENCE TO RELATED APPLICATIONS

This application claims the priority under 35 U.S.C. §119 of European patent application no. 13290290.9, filed on Nov. 21, 2013, the contents of which are incorporated by reference herein.

FIELD

The present disclosure relates to a method of generating a structure comprising at least one virtual machine. Furthermore, the present disclosure relates to a corresponding structure.

BACKGROUND

Today, security plays an important role in many electronic devices and computing environments. For example, conventional mobile electronic devices may be used for payment transactions which require that sensitive payment-related data, such as user credentials, are input and/or stored on said devices, Such mobile electronic devices may for instance be equipped with a near field communication (NEC) interface based on radio frequency (RF) technology, in order to exchange payment-related data with a terminal device at a point-of-sale was).

Traditionally, sensitive payment-related data have been incorporated into dedicated security tokens such as smart cards, in which the data are inherently confined to a relatively trusted environment. However, with the advent of integrated solutions, in particular the integration of so-called secure elements (SE's) in mobile devices, payment-related data are often exposed to a potentially hostile environment, and therefore the confidentiality of these data may be at stake.

A secure element is often implemented as an embedded chip, more specifically as a tamper-proof integrated circuit with (pre-) installed smart-card-grade applications, for instance payment applications, which have a prescribed functionality and a prescribed level of security. Examples of such secure elements are the integrated circuits of the so-called "SmartMX" or "SmartMX2" series of IC's produced by NXP Semiconductors. Alternatively, so-called Subscriber Identity Modules (SIM's) or Universal Subscriber Identity Modules (USIM's) may be used as secure elements. Furthermore, secure digital (SD) cards, such as traditional SD cards or micro-SD cards, may be used as secure elements.

However, in spite of their tamper resistance, secure elements that are integrated in multi-functional mobile devices are inherently less secure than dedicated smart cards, for example, and therefore there is a continuous effort to increase their security level. This problem is aggravated when so-called software-based secure elements are used. Contrary to the secure elements described above that are generally referred to as hardware-based secure elements and that still offer a relatively protected environment in which data may be stored and computations may be performed a software-based secure element is typically arranged to store sensitive data in a general storage unit (e.g. the main memory) of a mobile device. This storage unit is usually not security-proof. Therefore, developers of software-based secure elements face the challenge of embedding adequate security measures in these secure elements.

Some of these security measures have shown promising results. For example, the use of so-called obfuscated virtual machines (OVM's) appears to offer an acceptable level of protection against reverse engineering attacks. As described in the article "Hindering Reverse Engineering: Thinking Outside the Box" by Dube, T. E. et al., published in Security & Privacy, IEEE (Volume: 6, Issue: 2), in March-April 2008, a possible defense against so-called structure-centric attacks, i.e. attacks that aim at revealing a computer program's function, is based on the use of virtual machine logic, which implements a virtual architecture from a native instruction set. In order to further strengthen said defense, a virtual machine (VM) may be obfuscated. Therefore, a software-based secure element that comprises an obfuscated virtual machine (OVM) appears to offer a reasonable level of security. EP 2 482 184 A1 describes an adaptive obfuscated virtual machine. More specifically, it describes the generation of an obfuscated bytecode for execution in an adaptive VM execution environment. A VM compiler compiles a high level code to obtain the bytecode and applies a virtual instruction set architecture (V-ISA) definition to generate an optimized instruction combining two or more individual instructions in the bytecode. The VM execution environment is adapted to interpret and execute the optimized instruction.

However, a software-based secure element based on an OVM may still be susceptible to cloning. In particular, the OVM—in which cryptographic keys or other user credentials are stored—may be duplicated and used on an unauthorized mobile device, for example. In this case, the unauthorized mobile device might enable the same transactions as the original, authorized mobile device, which is clearly unacceptable. Thus, there still exists a need to improve the level of security offered by software-based secure elements of the kind set forth.

SUMMARY

There is provided a method of generating a structure comprising at least one virtual machine, the method comprising: obfuscating a first virtual machine source code, thereby yielding a first OVM source code; associating a processor identifier with the first OVM source code, thereby yielding a processor-specific first OVM source code; compiling the processor-specific first OVM source code, thereby yielding a processor-specific first OVM.

According to an illustrative embodiment, the method further comprises: obfuscating a second virtual machine source code, thereby yielding a second OVM source code; associating a secret identifier of the processor-specific first OVM with the second OVM source code, thereby yielding a processor-specific second OVM source code; compiling the processor-specific second OVM source code, thereby yielding a processor-specific second OVM.

According to another illustrative embodiment, the secret identifier is generated by a random number generator when the processor-specific first OVM source code is compiled.

According to a further illustrative embodiment, the secret identifier is stored in an entry of a database, and, in said entry, also a public identifier of the processor-specific first OVM is stored in order to facilitate retrieval of said secret identifier. According to a further illustrative embodiment, the method further comprises: in addition to associating a secret identifier of the processor-specific first OVM with the second OVM source code, associating a user identifier with the second OVM source code, thereby yielding a processorand user-specific second OVM source code; compiling the processor- and user-specific second OVM source code, thereby yielding a processor- and user-specific second OVM.

According to a further illustrative embodiment, the user identifier comprises a personal identification number.

According to a further illustrative embodiment, the user identifier comprises a biometric feature of the user.

According to a further illustrative embodiment, the method further comprises integrating an operating system component into the second OVM.

According to a further illustrative embodiment, the method further comprises building a tree of processor-specific OVM's by, for each OVM to be generated: associating a secret identifier of a processor-specific existing OVM with an OVM source code for a next OVM to be generated, thereby yielding a processor-specific next OVM source code, wherein said processor-specific existing OVM is one level higher in said tree than the next OVM to be generated; compiling the processor-specific next OVM source code, thereby yielding a processor-specific next OVM.

According to a further illustrative embodiment, the method further comprises integrating a monotonic counter into the structure.

According to a further illustrative embodiment, the processor identifier is retrieved from a read-only memory mask comprised in a computing device or from one-time-programmable bits comprised in said computing device, wherein said computing device comprises a processor identified by said processor identifier.

Furthermore, there is provided a structure generated by a method of the kind set forth.

According to a further illustrative embodiment, at least one virtual machine of the structure is allocated to a secure element.

According to a further illustrative embodiment, a computing device is provided, in particular a mobile device for supporting payment transactions, which comprises a structure of the kind set forth.

According to a further illustrative embodiment, the computing device comprises a read-only memory in which the processor-specific first OVM has been stored.

DESCRIPTION OF DRAWINGS

Embodiments will be described in more detail with reference to the appended drawings, in which.

DESCRIPTION OF EMBODIMENTS

Figure 1:
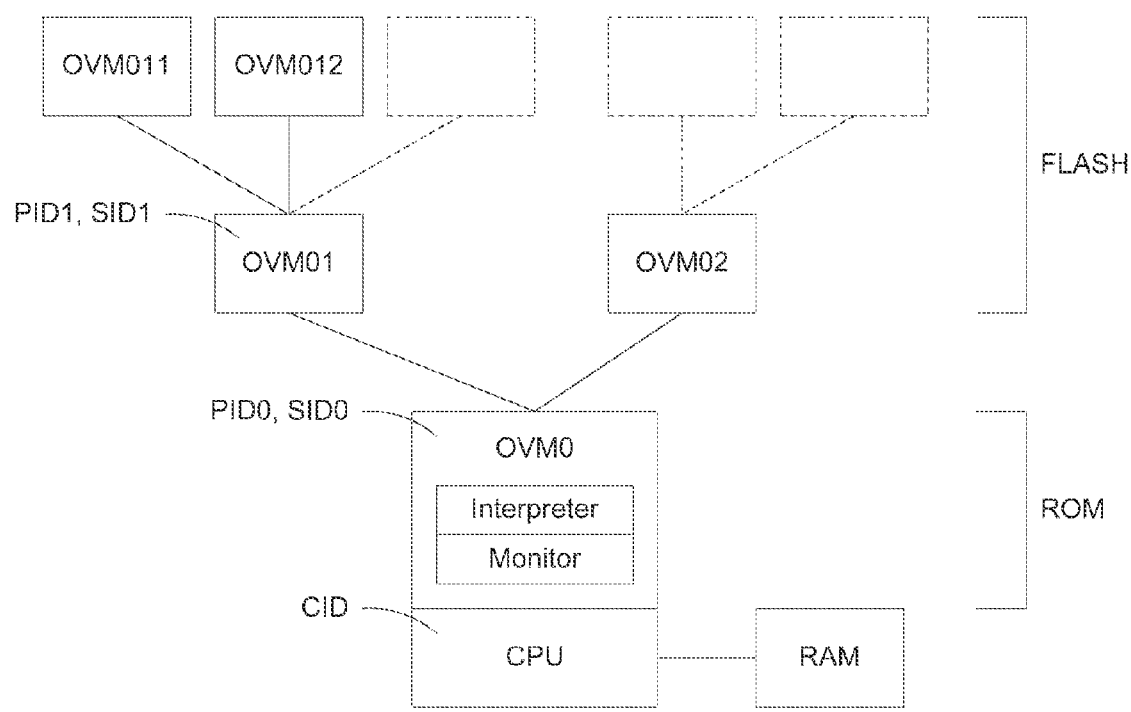
FIG. 1 shows a first illustrative embodiment of a structure comprising obfuscated virtual machines.

FIG. 1 shows a first illustrative embodiment of a structure comprising obfuscated virtual machines. The structure has been generated by a method as disclosed herein. In this illustrative embodiment, the structure comprises several obfuscated virtual machines OVM0, OVM01, OVM011, OVM012, OVM02 organized as a "tree of trust" which is bound to the computing device in which the structure is embedded. In this way, a secure boot of the computing device may be achieved, as well as a secure loading of any applications which are embedded in said obfuscated virtual machines.

Typically, a computing device integrates on-chip components, such as a processor CPU, a read-only memory ROM and a random access memory RAM, and components external to the chip containing the processor CPU, such as a non-volatile memory FLASH. In this example, the read-only memory ROM comprises an initial obfuscated virtual machine OVM0 which has been compiled in accordance with a method as disclosed herein. Since the compilation of the initial obfuscated virtual machine OVM0 has been performed on a source code that is processor-specific, i.e. that is associated with an identifier CID of the processor CPU, the virtual machine OVM0 itself is also processor-specific. In other words, the virtual machine OVM0 is effectively bound to the hardware on which it is executed, in particular to the processor.

The read-only ROM further comprises an OVM interpreter that can only execute OVM's compiled with the processor identifier CID. The processor identifier CID may be a public or a secret identifier, stored either in a ROM mask or in OTP bits of the computing device. The processor identifier CID may be chosen by the computing device manufacturer as unique per device, per wafer, or per wafer lot. Instead of being implemented in the read-only memory ROM, the OVM interpreter of the initial obfuscated virtual machine OVM0 may also be implemented in hardware in a dedicated processing unit (not shown) that may be able to execute native code and/or OVM code.

Since the initial obfuscated virtual machine OVM0 has been compiled with the processor identifier CID, only the OVM interpreter in the read-only memory ROM can execute it. In operation, the initial obfuscated virtual machine OVM0 securely initializes the computing device registers, memories, peripherals, and interfaces, for example. Furthermore, the initial obfuscated virtual machine OVM0 may comprise a monitor and an OVM interpreter that can respectively launch and execute further obfuscated virtual machines OVM01, OVM02 compiled with a secret identifier of the initial obfuscated virtual machine OVM0. In turn, a further obfuscated virtual machine OVM01 may comprise a monitor and a further OVM interpreter that can respectively launch and execute further obfuscated virtual machines OVM011, OVM012 compiled with a secret identifier of the obfuscated virtual machines OVM01, OVM02 one level higher in the structure. This process may be repeated such that a tree of trust of processor-specific obfuscated virtual machines may be built.

Typically, an OVM may embed secret data in its code. In accordance with an illustrative embodiment of a method as disclosed herein, every OVM—except the initial obfuscated virtual machine OVM0 is generated by compiling a virtual machine source code that has been associated with a secret identifier SID0, SID1 of an OVM one level higher in the structure. Furthermore, the compilation of an OVM may generate a public identifier PID0, PID1 and a secret identifier SID0, SID1 based on a random number generator embedded in the OVM compiler. An OVM compiler my access a device manufacturer database containing entries in which pairs of public and secret identifiers are stored; the OVM compiler may receive the public identifier from a given OVM of the computing device and map it in the database in order to retrieve the corresponding secret identifier. Accordingly, the compilation process may be based on the following function:

$$OVMxy=Compile[PIDx,VMSy,Map(PIDx,SIDx)]$$

In this function, PIDx denotes the public identifier of an OVM whose secret identifier is used to compile the current OVM, OVMxy denotes the current OVM, VMSy denotes the source code of the current OVM, and SIDx denotes the secret identifier.

In accordance therewith, an OVM may able to launch and execute another OVM provided that the latter has been compiled with the secret identifier of the former. If an OVM is not executed by the correct OVM, or more precisely by the OVM interpreter of the correct OVM, then the execution will Typically, the OVM interpreter of a given OVM may be executed within the OVM itself. Alternatively, the OVM interpreter of a given OVM may be loaded in the random access memory RAM in order to be executed in native code by the processor CPU.

In order to prevent so-called rollback attacks, e.g. by loading an older OVM version in the non-volatile memory FLASH, the structure may be provided with a monotonic counter. A monotonic counter is a tamper-resistant embedded counter whose value, once incremented, cannot be reverted back to a previous value. The monotonic counter may be kept in another non-volatile memory, such as an EEPROM, integrated in the computing device. The monotonic counter may be incremented on every boot, every OVM execution or every transaction. The value of the counter is transmitted to the OVM compiler, which embeds it in the OVM.

Figure 2:
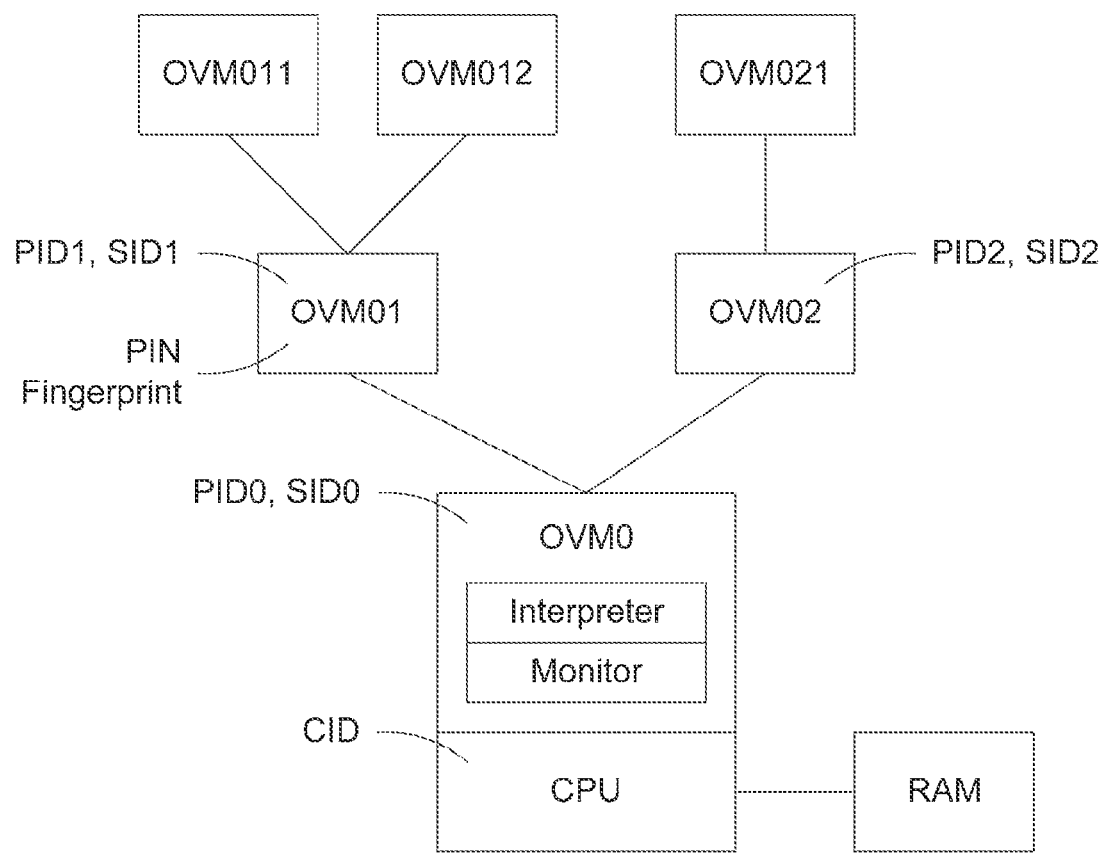
FIG. 2 shows a second illustrative embodiment of a structure comprising obfuscated virtual machines.

FIG. 2 shows a second illustrative embodiment of a structure comprising obfuscated virtual machines. In order to further increase the level of security, an OVM may also be hound to a user. In the example, obfuscated virtual machine OVM01 executes obfuscated virtual machine OVM011 or obfuscated virtual machine OVM012 only if the user enters a correct personal identification number PIN and/or if a scanned fingerprint corresponds to a fingerprint template of the user. Other obfuscated virtual machines in the shown example, such as OVM021, do not require a user identifier.

In order to bind an OVM to a user, an OVM compiler integrates a user identifier into the compilation process. The user identifier may either be a secret only known by the user, e.g. a personal identification number or a biometric feature specific to the user, e.g. a scanned fingerprint. In that case, an OVM (interpreter) executes an OVM lower in the structure only if the user has provided the user identifier; otherwise the execution fails. If the user identifier comprises a personal identification number PIN, then the compilation process may be based on the following function:

OVMxy=Compile[PIDx,VMSy,PIN,Map(PIDx, SIDx)]

Typically, a scanned fingerprint is transmitted by a fingerprint sensor in the form of a template FPT. Thus, if the user identifier comprises a scanned fingerprint, then the compilation process may be based on the following function:

OVMxy=Compile[PIDx,VMSy,FPT,Map(PIDx, SIDx)]

The personal identification number PM or the fingerprint template FPT may be transmitted to the OVM compiler in encrypted form. Furthermore, when a user has changed his personal identification number PIN, for example, the computing device may request a back-end system to compile a new OVM for the new personal identification number.

Figure 3:
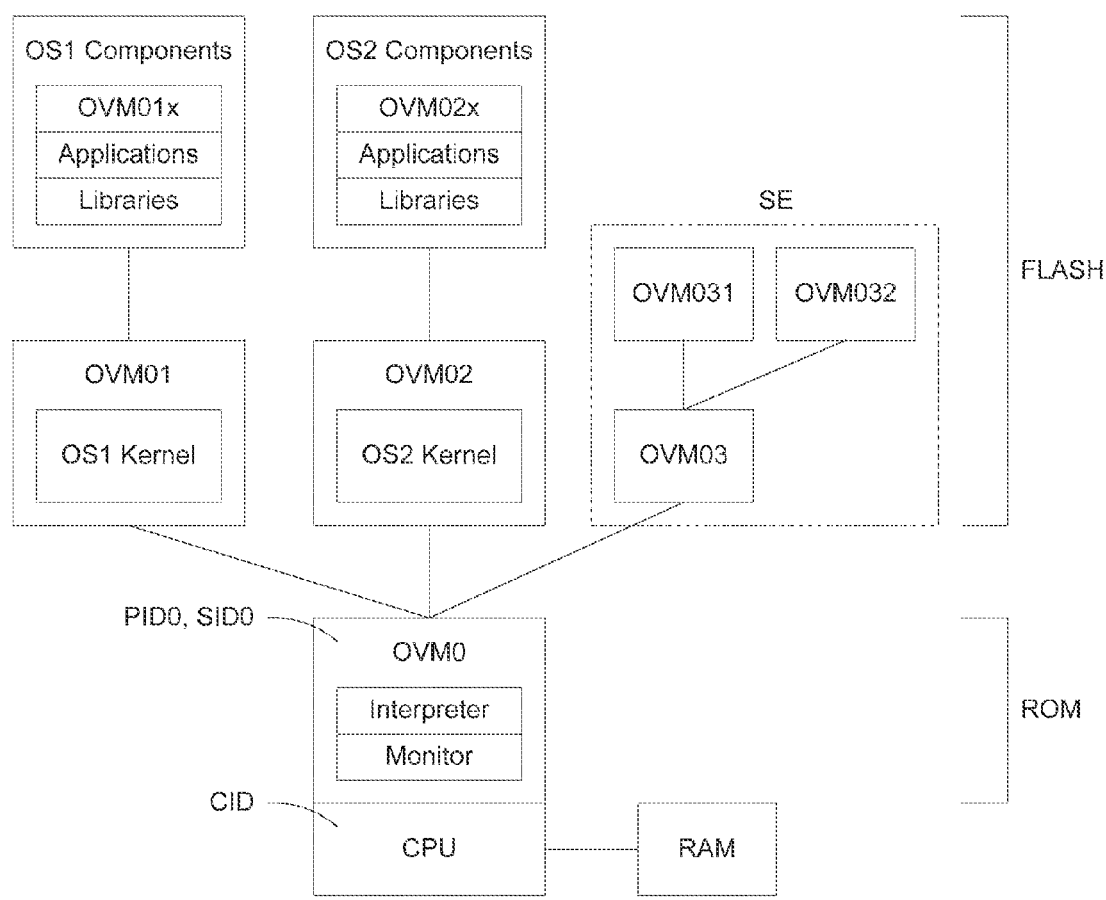
FIG. 3 shows a third illustrative embodiment of a structure comprising obfuscated virtual machines.

FIG. 3 shows a third illustrative embodiment of a structure comprising obfuscated virtual machines. In this example, a subset of the structure of obfuscated virtual machines OVM03, OVM031, OVM032 constitutes a computing environment allocated to a secure element SE for executing specific applications, for example payment applications. Another subset of the structure of obfuscated virtual machines OVM01, OVM1x, OVM02, OVM02x, constitutes a computing environment allocated to operating systems of the computing device. More specifically, in the latter subset kernels and components of two different operating systems OS1, OS2 are embedded in the obfuscated virtual machines OVM01, OVM1x, OVM02, OVM02x. In this way, also the operating systems of the computing device may be bound to the hardware on which they are executed. Obfuscated virtual machines OVM01 and OVM02 embed operating system kernels OS1, OS2 comprising an OVM interpreter that can launch and execute obfuscated virtual machines OVM01x, OVM02x that have been compiled for OVM01 and OVM02, respectively. The OS kernels embedded in the obfuscated virtual machines may either launch native libraries and applications, or use their OVM interpreters to launch and execute further obfuscated virtual machines that have been compiled for them, i.e. for the "kernel OVM's".

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

CPU processor
CID processor identifier
OVM0 obfuscated virtual machine
OVM01 obfuscated virtual machine
OVM02 obfuscated virtual machine
OVM011 obfuscated virtual machine
OVM012 obfuscated virtual machine
OVM021 obfuscated virtual machine
OVM01x obfuscated virtual machine
OVM02x obfuscated virtual machine PID0 public identifier
PID1 public identifier
PID2 public identifier
SID0 secret identifier
SID1 secret identifier
SID2 secret identifier
FLASH non-volatile memory
ROM read-only memory
RAM random access memory
PIN personal identification number
OS1 operating system
OS2 operating system
SE secure element

The invention claimed is:

1. A method of generating a plurality of Obfuscated Virtual Machines (OVMs), the method comprising:
 obfuscating a first virtual machine source code, thereby yielding a first OVM source code;
 associating a unique processor identifier of a processor on which a first OVM of the plurality of OVMs is executed with the first OVM source code, thereby yielding a processor-specific first OVM source code, wherein the first OVM is bound to hardware of the processor;
 compiling the processor-specific first OVM source code taking into account the unique processor identifier, thereby yielding a processor-specific first OVM that can only be executed by an OVM interpreter implemented in the hardware of the processor.

2. The method of claim 1, further comprising:
 obfuscating a second virtual machine source code, thereby yielding a second OVM source code;
 associating a secret identifier of the processor-specific first OVM with the second OVM source code, thereby yielding a processor-specific second OVM source code;
 compiling the processor-specific second OVM source code, thereby yielding a processor-specific second OVM.

3. The method of claim 2, wherein the secret identifier is generated by a random number generator when the processor-specific first OVM source code is compiled.

4. The method of claim 3, wherein the secret identifier is stored in an entry of a database with a public identifier of the processor-specific first OVM to facilitate retrieval of said secret identifier.

5. The method of claim 2, further comprising:
 in addition to associating the secret identifier of the processor-specific first OVM with the second OVM source code, associating a user identifier with the second OVM source code, thereby yielding a processor- and user-specific second OVM source code;
 compiling the processor- and user-specific second OVM source code, thereby yielding a processor- and user-specific second OVM.

6. The method of claim 5, wherein the user identifier comprises a personal identification number.

7. The method of claim 5, wherein the user identifier comprises a biometric feature of the user.

8. The method of claim 2, further comprising:
 integrating an operating system component into the processor-specific second OVM.

9. The method of claim 1, further comprising:
 building a tree of processor-specific OVMs by, for each OVM to be generated:
  associating a secret identifier of a processor-specific existing OVM with an OVM source code for a next OVM to be generated, thereby yielding a processor specific next OVM source code, wherein said processor-specific existing OVM is one level higher in said tree than the next OVM to be generated; and
  compiling the processor-specific next OVM source code, thereby yielding a processor-specific next OVM.

10. The method of claim 1, further comprising:
 integrating a monotonic counter into the plurality of OVMs.

11. The method of claim 1, wherein the unique processor identifier is retrieved from a read-only memory mask comprised in a computing device or from one-time-programmable bits comprised in said computing device, wherein said computing device comprises the processor identified by said unique processor identifier.

12. A mobile computing device for supporting payment transactions, the mobile computing device comprising:
 a memory configured to store a plurality of Obfuscated Virtual Machines (OVMs); and
 a processor configured to generate the plurality of OVMs, obfuscate a first virtual machine source code, thereby yielding a first OVM source code, associate a unique processor identifier of the processor on which a first OVM of the plurality of OVMs is executed with the first OVM source code, thereby yielding a processor-specific first OVM source code, wherein the first OVM is bound to hardware of the processor, and compile the processor-specific first OVM source code taking into account the unique processor identifier, thereby yielding a processor-specific first OVM that can only be executed by an OVM interpreter implemented in the hardware of the processor.

13. The mobile computing device of claim 12, wherein the first OVM is allocated to a secure element.

14. A non-transitory computer-readable storage medium encoded with instructions executable by a processor of a computing device, the non-transitory computer-readable medium comprising:
 instructions for generating a plurality of Obfuscated Virtual Machines (OVMs);
 instructions for obfuscating a first virtual machine source code, thereby yielding a first OVM source code;
 instructions for associating a unique processor identifier of a processor on which a first OVM of the plurality of OVMs is executed with the first OVM source code, thereby yielding a processor-specific first OVM source code, wherein the first OVM is bound to hardware of the processor; and
 instructions for compiling the processor-specific first OVM source code taking into account the unique processor identifier, thereby yielding a processor-specific first OVM that can only be executed by an OVM interpreter implemented in the hardware of the processor.

* * * * *